Aug. 20, 1940.    H. H. RODIN    2,212,480
AUTOMATIC TOWING AND STEERING DEVICE
Filed Aug. 9, 1939
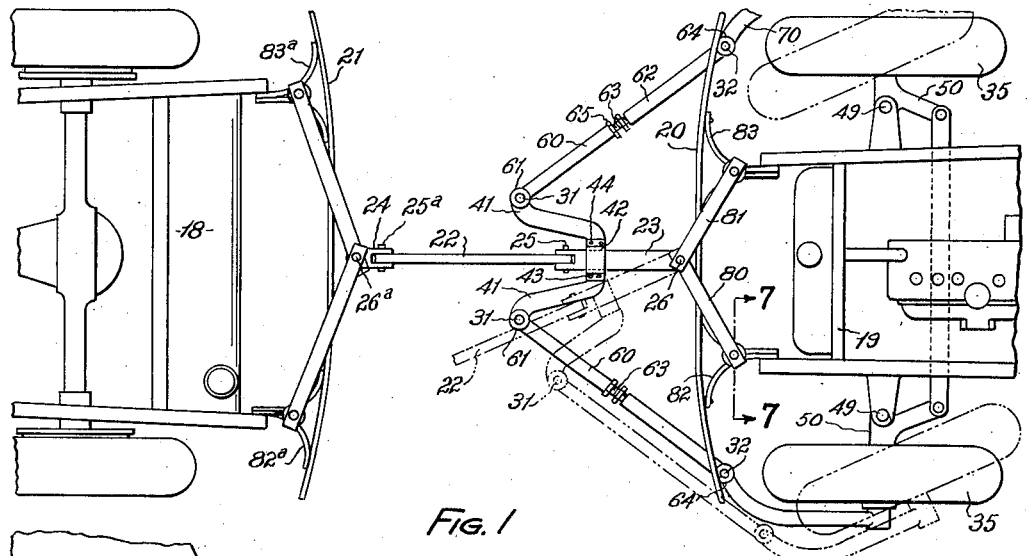
Fig. 1
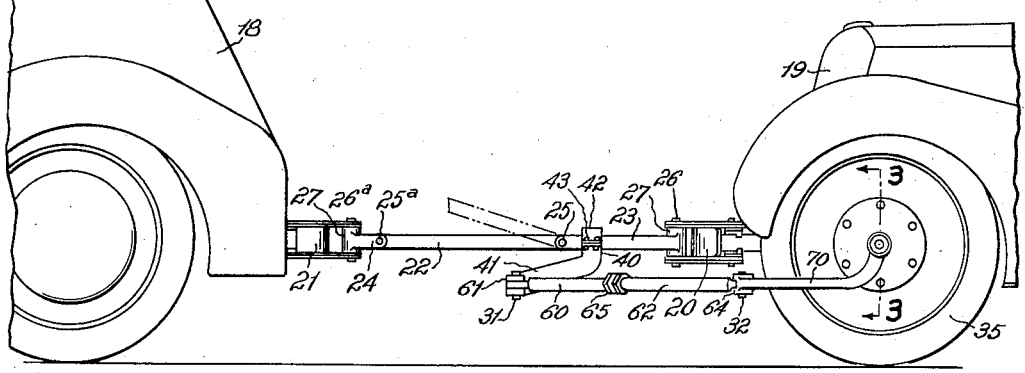
Fig. 2
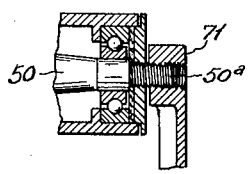
Fig. 3
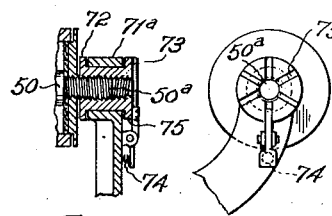
Fig. 5    Fig. 6
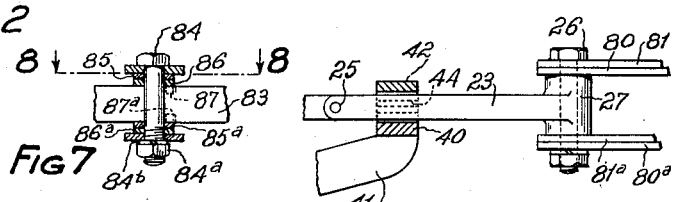
Fig. 7    Fig. 4
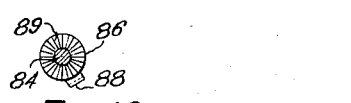
Fig. 8    Fig. 10
Fig. 9
INVENTOR:
HARRY H. RODIN
BY Morton S. Brockman
ATTORNEY Patented Aug. 20, 1940

2,212,480

UNITED STATES PATENT OFFICE 2,212,480

AUTOMATIC TOWING AND STEERING DEVICE

Harry H. Rodin, Cleveland, Ohio, assignor of one-half to August Jeney, Jr., Cleveland, Ohio Application August 9, 1939, Serial No. 289,222

4 Claims. (Cl. 280—33.55)

This invention relates to automobile towing devices and particularly to such links or draw-bars which are coupled with automatic steering mechanism attached to the car being towed. This invention is a modification of the automatic towing and steering device referred to in my co-pending applications Serial No. 230,805, filed September 20, 1938 for a Universal automatic hitch, and Serial No. 289,221, filed August 9, 1939 for an Automatic tow bar.

The primary object of the instant invention is to provide a device of the type mentioned which is self-aligning and is itself free of torsional stress, also which will not distort or strain the apparatus to which it is connected; and which is nevertheless, compact, light in weight and therefore easy to transport.

Another object is to provide a device which may be quickly and easily installed or attached to readily accessible parts of an automobile, and which may be handled and operated by one person who need not be particularly skilled in the use of such appliances.

A further object of the invention is to provide a one-man tow-bar with an automatic steering mechanism which engages the outside members on a steerable front wheel of the car being towed, and which is safe, fool-proof and secure in operation.

Still another object is to create a device of the type mentioned which is made of standard parts and fittings; is economical to manufacture, assemble or repair; and which is more or less universal in its application; that is, one which is easily adjustable or made suitable for engagement and use with all current standard makes of automobiles.

These and other objects and features of the invention will become apparent from a study of the following description and claims together with the accompanying drawing in which like parts are designated by like reference characters and wherein:

Figure 1 is a plan view of the automatic towing and steering device connecting two automobiles in tandem;

Figure 2 is a side view of the same;

Figure 3 is a sectional view taken along the lines 3—3 of the Figure 2;

Figure 4 is an enlarged view showing part of the draw-bar and steering mechanism;

Figure 5 is a sectional view of a modified form of the steering collar shown in the Figure 3;

Figure 6 is a side elevation of the modified form of collar illustrated in the Figure 5;

Figure 7 is a cross-sectional view of a connecting device taken along the lines 7—7 of the Figure 1;

Figure 8 is a plan view taken along the lines 8—8 of the Figure 7;

Figure 9 is a side view of a pair of corrugated washer members; and

Figure 10 is a view taken along the lines 10—10 of the Figure 9.

The instant invention consists broadly of a draw-bar member, a steering member, connector members for attaching the draw-bar to the vehicles in tandem position and a steering means connecting the draw-bar to the steerable front wheels of the rear vehicle.

The draw-bar member consists of two metal bars or beams 22 and 23 linked together with a horizontal pin 25 at about its mid-section. The forward beam 22 has pivotally connected to it by means of the horizontal pin 25a, a short metal section referred to and designated as the link 24. The rear end of the rear beam 23 and the front end of the link 24 have integral therewith stout vertical tubular sections 27; each bored so as to form suitable bearings for the vertical pivot pins 26 and 26a. The two tubular sections 27 serve as mounts for the attachment bars which will be hereinafter described in detail. The pivot means formed at the pin 26 is also referred to herein as the draw-bar member first flexible joint.

As this device is particularly adaptable for towing automobiles having front and rear bumpers mounted on bifurcated brackets, there is provided as shown in the drawing, a draw-bar mounting means. This draw-bar mounting means as described for attachment to the rear vehicle, and which is practically the same on the front vehicle, consists of two sets of parallel bars radiating from the tubular section 27, outwardly and rearwardly toward the bracket arms 82 and 83 which support the bumper 20.

In the drawing there is shown the four metal bars 80, 81, 80a, and 81a of equal length and each is provided with two equally spaced holes near its ends. The left upper bar 80 extends from the vertical pin 26 to the fork of the two bumper bracket arms 82 and 83. The bar 80 rests on the top of the tubular section 27 and rests on the top edge of the bumper 20 so that its rearward hole is at about the juncture of the arms 82 and 83. The upper right bar 81 similarly extends from the pin 26 to the right bumper bracket arms 82 and 83. The lower left and lower right bars 80a and 81a are in line with the front bars 80 and 81 and similarly extend from the pin 26 to the left and right bumper arms 82 and 83 excepting that they contact the bottom of the tubular section 27 and are carried below the bumper 20. The link 24 is, through the tubular section 27, similarly connected to the rear bumper bracket arms 82a and 83a of the rear bumper 21 on the front vehicle 18.

In order to engage the bars 80, 81, 80a and 81a with the bumper arms 82 and 83 and 82a and 83a, there are provided eight sets of co-related corrugated washers. Each pair of washers has a series of matched, radially extending ridges and channels on their abutting surfaces which channels and ridges are designated and referred to herein as corrugations 89. Each of the washers has a small tab extending either downward or upward from it. The tabs of each separate pair however project in the same direction.

In connecting the beam 23 to the left front bumper bracket members, the washer 86, having its corrugation 89 facing upward, is placed over the two bracket arms 82 and 83 with its tab 88 contacting the outside surface of the bracket arm 82. The washer 85, having its corrugation 89 facing downward, is meshed with the washer 86 and has its tab 87 contacting the outside surface of the bracket arm 83.

A machine bolt or pin 84 is then inserted in the hole of the bar 80, is projected through the two washers 85 and 86 and passed between the arms 82 and 83. Another set of corrugated washers, consisting of washers 85a and 86a, is placed over the bolt 84 with their upwardly projecting tabs 87a and 88a respectively engaging the bottom outside surfaces of the two arms 82 and 83. Next, the lower bar 80a is placed over the pin and all of the aforementioned arms, washers and bars are locked in place with the pin 84, the nut 84a and the lock washer 84b. The assembled and thus attached bars 80, 80a, 81 and 81a form a rigid and solid connection with the front end of the frame of the rear vehicle 19.

The steering member consists of a slidable section, which for convenience is referred to herein as a collar, to which collar are attached two projecting arms; and an adjustable length guide arm and a steering arm, each of which will be described more fully hereinafter.

The collar member which is slidable on the rear draw-bar beam 23 consists of two channelled sections. The bottom section 40 somewhat resembles an upright U. It fits the bottom half of the beam 23 and has extending radially therefrom two rigid arms 41. The end of each arm 41 is drilled so as to have a vertical hole therein suitable for receiving one of the clevis pins 31. The hinge or pivot means formed at the pins 31 is also referred to herein as the draw-bar member or collar member second flexible joint.

Directly above the bottom section 40 there is a similar section 42 which resembles an inverted U and similarly fits the top half of the beam 23. The top section 42 however, does not have any arms extending therefrom.

The two sections 40 and 42 each have abutting horizontal flanges 44 that have suitable holes for receiving bolts and nuts for joining them together. When so assembled the sections 40 and 42 form a collar-like member which fits snugly, but is still free enough to slide along the beam 23 between the horizontal pin 25 and the vertical pin 26. The collar member is made slidable on the bar 23 to facilitate the proper attachment of the device to the towed vehicle and also to permit the automatic steering member to absorb longitudinal vibration or jerks of the draw-bar member which are caused by sudden starting and stopping. A mere turning of the draw-bar 23 itself during normal use does not cause the collar to slide thereon as is the case with many of the prior art devices.

The guide arm is made in two sections. The first or tubular section 60 is provided with a simple clevis 61 which is linked, at one end, to a collar arm 41 with the pin 31. Its other end is internally threaded and engages the externally threaded end 63 of the solid arm 62. The unthreaded end of the arm 62 has another clevis 64 integral therewith and the two sections 60 and 62 are made rigid and are firmly held together with the simple lock-nut 65 after certain adjustments have been made.

The steering portion consists of a curved arm 70, one end of which is drilled vertically to receive the pin 32 of the clevis 64. The other end of the arm has a threaded collar 71 which screws onto the threaded end 50a of the stub axle 50 of the front wheel 35 of the rear vehicle 19. The arm 70 is bent slightly so that when the collar 71 is placed close to, but not quite touching the wheel hub members, the clevis pin 32 will be in the center line of the wheel tread. Also, the arm 70 is curved downward slightly so that it clears the bumper 20 and is connected to the arm 41 in a manner which causes it to be substantially in horizontal alignment with the beam member 23 and the frame of the car. The flexible connection formed by the clevis pin 32 is sometimes referred to as the third flexible joint.

While the drawing does not show the duplication of all parts in full, this device has nevertheless two guide arms and two steering arms engaging the outer ends of both front wheel axles 50.

A slightly modified form of steering portion collar is shown, which simplifies attaching the device. Ordinarily when the arm 70 with its collar 71 is applied, the front wheel axle 50 must necessarily have to be raised up so as to permit the end of the arm 70 to clear the ground while screwing it in place. To eliminate the necessity of jacking up the two front wheels of the vehicle, the collar member 71a of the modified form is provided with an internally threaded bushing 72. This bushing has a series of keyways 73 which facilitate its turning and also which provides a groove for receiving a conventional spring key 74. The spring actuated key 74, when in engagement with one of the keyways 73, prevents the threaded bushing 72 from coming off the axle portion 50a. Also the threaded bushing 72 is provided with suitable circumferential flanges 75 which hold it within the collar 71a. This modified form of attaching the steering arm 70 to the stub axle 50 is clearly illustrated in the Figures 5 and 6.

The advantage of this device over others of the art, lies first, in the fact that the draw-bar is attached only to rigid and substantial parts of the vehicle frame; and secondly, in the fact that the automatic steering of the rear car is effected by actuating both front wheels simultaneously in the same degree.

In order to make this device fully effective, it is necessary therefore, that the two imaginary figures formed by the corner points represented by the one vertical pin 26, the four clevis pins 31 and 32 and the two king-pins 49 form separate parallelograms; and that the figures retain their parallelogram characteristics regardless of the turn or deviation from the normal position of the draw-bar beam 23. With this device, if the guide arms 60 and 62 are each adjusted, by either lengthening or shortening, so that their separate lengths are equal to the distance between points 26 and 49, and if the draw-bar is mounted adjacent the centers of the two bumpers 20 and 21, so as to bring the clevis pins 31 and 32 the same distances apart that the vertical pin 26 is from the king-pins 49; the distance between the pins 31 and 26 will automatically become the same as the distance which exists between the king-pins 49 and the clevis pins 32.

A further advantage of this device is that it is more satisfactory for towing new cars from the factory to some distant dealer, because it does not injure the mechanism or effect the polish or finish of the new vehicle as would otherwise occur if exposed parts of the vehicle were contacted or engaged.

Another advantage is that because of its light weight and relatively collapsible and nested parts, it may be easily carried or transported from city to another city without too much inconvenience and expense.

It will now be clear that there is provided by this invention an automatic tow-bar which accomplishes the objects heretofore set forth. While the invention has been described in a specific form and while certain general terms and special language have been used, it is to be understood that the embodiment of the invention as described is suggestive only and is not to be considered in a limiting sense. It is to be further understood that there may be other forms or adaptations of the invention which will suggest themselves to persons familiar with the art and those modifications are also considered to be within the broad scope of the invention set forth as no limitations upon it are intended other than those imposed thereon by the breadth of the appended claims.

I claim:

1. A combined towing and steering device for a towed automobile having a steerable wheel member and a king-pin thereon, comprising in combination, a draw-bar member having a first pivot means thereon connected to the said automobile, a collar member having a second pivot means thereon mounted on the said draw-bar member, a guide arm member having a third pivot means thereon and connected to the said collar member pivot means, the said third pivot means being the same distance from the second pivot means as the said king-pin is from the first pivot means, and a steering arm member connected to the guide arm pivot means and engageable with the said steerable wheel member, the said third pivot means being the same distance from the said king-pin as the second pivot means is from the first pivot means.

2. A combined towing and steering device for a towed automobile having a steerable wheel member and a king-pin thereon, comprising in combination, a draw-bar member having spaced first and second pivot means thereon connected to the said towed automobile, and an arm member having a third pivot means and including two spaced ends connected at one of its ends to the said second pivot means and at its other end to the said wheel member, the said second and third pivot means being the same distance apart as the first pivot means and the said king-pin, and the said third pivot means and the said king-pin being the same distance apart as the said first and second pivot means.

3. A combined towing and steering device for a towed automobile having a steerable wheel axle free end and having a king-pin thereon, comprising, a draw-bar member having spaced first and second pivot means thereon connected to the said towed automobile, a guide arm member having a third pivot means thereon connected to the said draw-bar member second pivot means, and a steering arm member connected to the said guide arm member pivot means and engaging the said wheel axle free end, the said first and second pivot means being the same distance apart as the third pivot means and the said king-pin and and the said first pivot means and the said king-pin being the same distance apart as the said second and third pivot means.

4. A combined towing and steering device for a towed automobile having a resilient bumper, a king-pin and steerable wheel axle free end thereon, comprising, a draw-bar member having a first pivot means thereon connected to the said resilient bumper, a slidable collar member mounted on the said draw-bar member and having a second pivot means thereon, a guide arm member connected to the said collar member pivot means and having a third pivot means thereon, and a steering arm member connected to the said guide arm member pivot means and engaging the said wheel axle free end, the said first and second pivot means being the same distance apart as the third pivot means and the said king-pin and the said first pivot means and the said king-pin being the same distance apart as the said second and third pivot means.

HARRY H. RODIN.